United States Patent
Elmouttie et al.

(10) Patent No.: US 10,724,861 B2
(45) Date of Patent: Jul. 28, 2020

(54) MONITORING SYSTEMS AND METHODS

(71) Applicant: Commonwealth Scientific and Industrial Research Organisation, Acton, Australian Capital Territory (AU)

(72) Inventors: Marc Karim Elmouttie, Acton (AU); George Vladimir Poropat, Acton (AU)

(73) Assignee: Commonwealth Scientific and Industrial Research Organisation, Acton, Australian Capital Territory (AU)

( * ) Notice: Subject to any disclaimer, the term of this patent is extended or adjusted under 35 U.S.C. 154(b) by 175 days.

(21) Appl. No.: 15/748,987

(22) PCT Filed: Aug. 2, 2016

(86) PCT No.: PCT/AU2016/050693
§ 371 (c)(1),
(2) Date: Jan. 30, 2018

(87) PCT Pub. No.: WO2017/020077
PCT Pub. Date: Feb. 9, 2017

(65) Prior Publication Data
US 2019/0003832 A1    Jan. 3, 2019

(30) Foreign Application Priority Data
Aug. 3, 2015 (AU) ............................. 2015903092

(51) Int. Cl.
*G01C 11/06* (2006.01)
*G01S 13/86* (2006.01)
(Continued)

(52) U.S. Cl.
CPC ........... *G01C 11/06* (2013.01); *G01S 13/867* (2013.01); *G01S 13/885* (2013.01); *G01S 13/89* (2013.01);
(Continued)

(58) Field of Classification Search
None
See application file for complete search history.

(56) References Cited

U.S. PATENT DOCUMENTS

| | | | |
|---|---|---|---|
| 8,154,435 B2 | 4/2012 | Pett et al. | |
| 8,532,368 B2 * | 9/2013 | Se | G01C 11/06 |
| | | | 382/154 |

(Continued)

FOREIGN PATENT DOCUMENTS

| | | |
|---|---|---|
| AU | 2012101711 A4 | 12/2012 |
| CA | 1124053 A * | 5/1982 |

OTHER PUBLICATIONS

E. Saroglu et al., "Fusion of multisensory remote sending data: assessing the quality of resulting images", ITU, Civil Engineering Faculty, Istanbul, Turkey, five pages.
(Continued)

*Primary Examiner* — Michelle M Entezari
(74) *Attorney, Agent, or Firm* — Kilpatrick Townsend & Stockton LLP (57) ABSTRACT

This disclosure relates to a system for monitoring walls. The system receives first and second image data representing two-dimensional locations of multiple points of the wall associated with a first and second point in time, the second point in time being later than the first point in time. The system also receives depth data from a depth sensor indicative of a change in depth of the wall between the first point in time and the second point in time. The system then determines data indicative of a change of the two-dimensional locations of the multiple points of the wall between the first point in time and the second point in time based on the first image data, the second image data, and the depth data. This means correlations between the image data and
(Continued)

the depth data can be considered, which allows accurate perpendicular line of sight monitoring.

20 Claims, 7 Drawing Sheets (51) Int. Cl.
    *G01S 13/89*     (2006.01)
    *G01S 13/88*     (2006.01)
    *G06K 9/00*     (2006.01)
    *G06T 7/20*     (2017.01)
    *G06T 7/00*     (2017.01)
    *G06T 7/277*     (2017.01)
    *G06T 7/246*     (2017.01)
    *G01S 17/89*     (2020.01)
    *G01S 17/86*     (2020.01)

(52) U.S. Cl.
    CPC .......... *G06K 9/00637* (2013.01); *G06T 7/001* (2013.01); *G06T 7/0002* (2013.01); *G06T 7/20* (2013.01); *G06T 7/248* (2017.01); *G06T 7/277* (2017.01); *G01S 17/86* (2020.01); *G01S 17/89* (2013.01); *G06K 2009/00644* (2013.01); *G06T 2207/10016* (2013.01); *G06T 2207/10028* (2013.01); *G06T 2207/10048* (2013.01); *G06T 2207/20004* (2013.01); *G06T 2207/20221* (2013.01); *G06T 2207/30132* (2013.01); *G06T 2207/30184* (2013.01); *G06T 2207/30204* (2013.01)

(56) References Cited

U.S. PATENT DOCUMENTS

| | | | |
|---|---|---|---|
| 2004/0046690 A1 | 3/2004 | Reeves et al. | |
| 2006/0221250 A1* | 10/2006 | Rossbach | H04N 5/2355 348/630 |
| 2014/0095565 A1* | 4/2014 | Silbert | G01S 13/723 708/308 |
| 2014/0203959 A1* | 7/2014 | Kriel | G01S 13/867 342/52 |
| 2016/0070877 A1* | 3/2016 | Taylor | A61B 5/7275 703/9 |
| 2016/0377712 A1* | 12/2016 | Wu | G01S 13/867 342/52 |

OTHER PUBLICATIONS

J. Severin et al., "Open pit numerical model calibration using a pseudo three-dimensional radar monitoring technique", Slope Stability 2013, Brisbane, Australia, pp. 639-652.

Search Report and Written Opinion corresponding to International Application No. PCT/AU2016/050693.

Extended European Search Report from European Patent Office; Application No. 16831971.3 dated Mar. 15, 2019.

* cited by examiner

MONITORING SYSTEMS AND METHODS

CROSS-REFERENCE TO RELATED APPLICATIONS

The present application claims priority from Australian Provisional Patent Application No 2015903092 filed on 3 Aug. 2015, the content of which is incorporated herein by reference.

TECHNICAL FIELD

This disclosure relates to monitoring walls. In particular, but not limited to, this disclosure relates to methods and systems including computer systems for monitoring walls.

BACKGROUND

Figure 1:
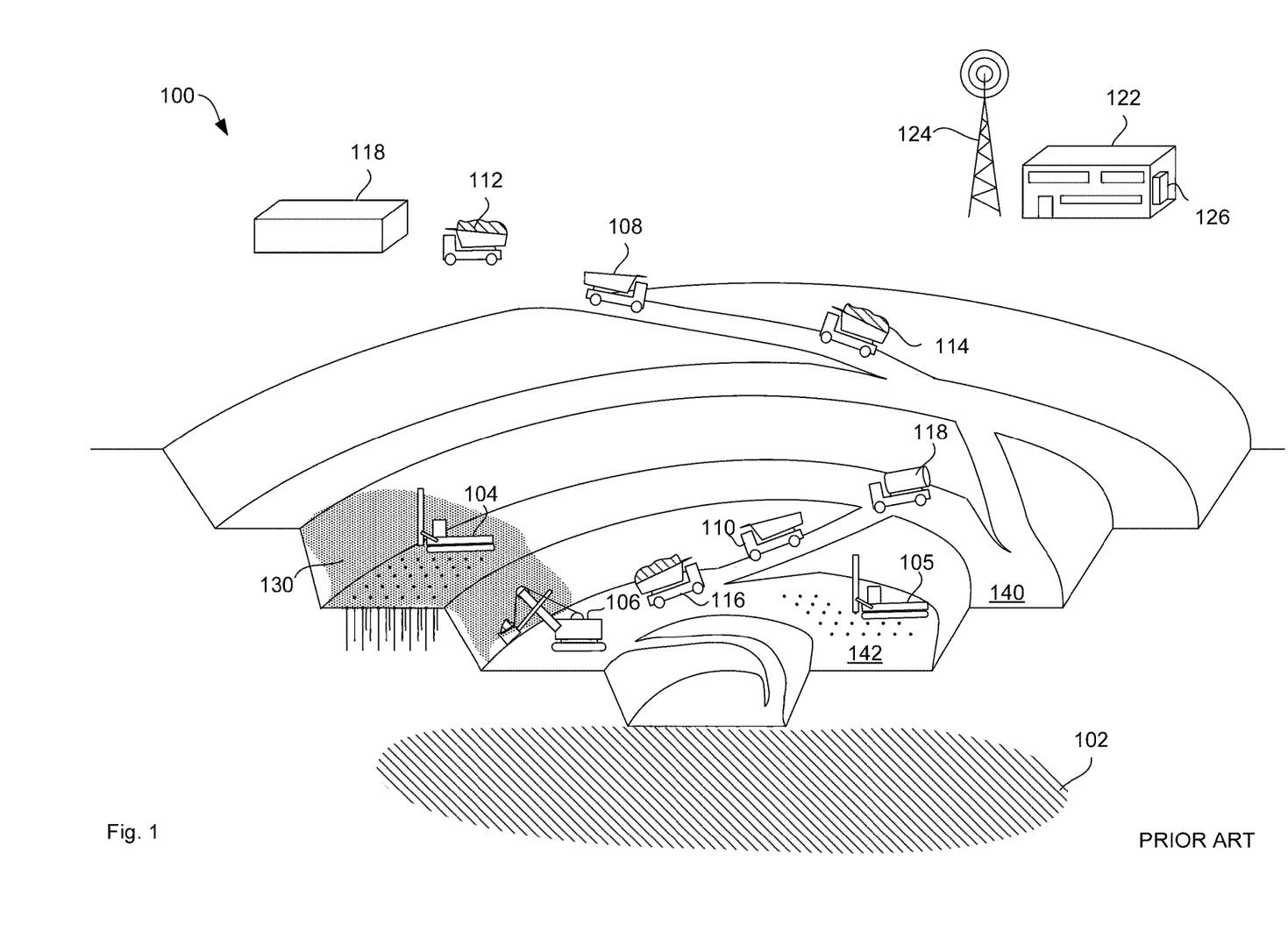

FIG. 1 refers to application in mining and illustrates a simplified open-pit mine 100. The mine 100 comprises an ore deposit 102, two blasthole drills 104 and 105, a shovel 106, empty trucks 108 and 110 and loaded trucks 112, 114 and 116. The mine 100 further comprises a supply machine 118, such as a fuel truck. The drill 104 drills blastholes, the material is blasted and then loaded onto truck 110. The truck 110 then transports the material to a processing plant 118. Similarly, drill 105 also drills blastholes for later blasting.

While some of the examples herein relate to the mining of iron ore, it is to be understood that the invention is also applicable to other mining and non-mining operations, such as extraction of coal, copper or gold or monitoring of deformations of natural or man-made slopes, excavations, constructions and mobile plants.

Mine 100 further comprises a control centre 122 connected to an antenna 124 and hosting on a computer 126 a mine control system. The mine control system 126 monitors operation and status data received from the mining machines wirelessly via antenna 124. In one example, the control centre 122 is located in proximity to the mine site while in other examples, the control centre 122 is remote from the mine site, such as in the closest major city or in the headquarters of the resource company.

As a result of in situ stresses in the rock mass, sub-optimal mine design given the uncertain geological conditions, continuous blasting and extraction of material from mine 100 or a combination of the above, some areas of mine 100 may become unstable. For example, an area 130 is highlighted in FIG. 1, which may become unstable. Unstable areas, and in particular, unstable walls, such as slopes, can fail and collapse, which poses a significant risk to the live of staff as well as to the commercial operation of the mine.

There exist monitoring systems that monitor potentially unstable areas, such as systems using laser range finders and radars. These existing systems generally monitor the line of sight movement. That is, these existing systems monitor whether the potentially unstable area moves towards or away from the laser and/or radar. A significant acceleration can indicate that the area is unstable and the system can raise an alarm. In many cases, however, the prediction of instability is inaccurate and in particular, areas have become unstable where the line of sight movement and/or acceleration did not indicate any problems.

US 2004/0046690 discloses a phase map calculated from radar images and video data to serve as a visual history of faults. While this offers a visual aid to the operator for monitoring line of sight movements, the outcome suffers from the above problem of insufficient inaccuracy especially when used for automatic monitoring without relying on a human operator.

U.S. Pat. No. 8,154,435 Pett discloses using a 2D interferometric synthetic aperture radar (InSAR) technique that provides a third resolving dimension. In particular, the third dimension is resolved by using a multi-baseline differential InSAR approach from two separate phase centres. While this solution is not limited to line of sight movement, it relies on multiple radar locations, which increases installation cost and complexity. Further, radar measurements have poor spatial resolution, which again leads to inaccurate results.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for monitoring a wall comprises:

receiving from an image sensor first image data representing two-dimensional locations of multiple points of the wall associated with a first point in time;

receiving from the image sensor second image data representing the two-dimensional locations of the multiple points of the wall associated with a second point in time, the second point in time being later than the first point in time;

receiving depth data from a depth sensor indicative of a change in depth of the wall between the first point in time and the second point in time; and determining data indicative of a change of the two-dimensional locations of the multiple points of the wall between the first point in time and the second point in time based on the first image data, the second image data, and the depth data.

Since the data indicative of the change of the two-dimensional locations is determined based on the image data as well as the depth data, correlations between the image data and the depth data can be considered, which results in a more accurate determination of the change of the two-dimensional locations. As a result, the line of sight measurement of the deformation of the wall can be enriched by a perpendicular line of sight measurement, which allows more complete monitoring of the wall than existing methods that rely on only line of sight measurements.

Receiving depth data may comprise receiving depth data indicative of an acceleration of the wall towards the depth sensor and determining the data indicative of the change of the two-dimensional locations may be based on the acceleration of the wall.

Determining the data indicative of the change of the two-dimensional location may be based on a positive correlation between the acceleration of the wall towards the depth sensor and an acceleration of the two-dimensional locations of the multiple points of the wall.

Determining the data indicative of the change of the two-dimensional locations may comprise applying an adaptive filter to the first and second image data and the adaptive filter may be parameterised based on the acceleration of the wall towards the depth sensor.

Applying an adaptive filter may comprise applying a Kalman filter and the Kalman filter may be parameterised based on the deformation of the wall towards the depth sensor.

The method may further comprise determining three dimensional movement of multiple blocks of a block model of the wall based on the data indicative of a change of the two-dimensional locations of the multiple points of the wall and the depth data.

The method may further comprise generating a graphical display indicative of the three dimensional movement of the multiple blocks of the block model of the wall.

Generating the graphical display may comprise generating graphical vectors indicating a three-dimensional velocity and three-dimensional direction of each block of the multiple blocks of the block model of the wall.

Generating the graphical display may comprise generating a graphical representation of each the multiple blocks of the block model of the wall with a colour indicative of the speed of movement of that block.

The method may further comprise generating an alarm based on the data indicative of a change of the two-dimensional locations of the multiple points of the wall.

Monitoring a wall may comprise monitoring a mining wall, receiving first image data may comprises receiving first image data representing two-dimensional locations of multiple points of the mining wall, receiving second image data may comprise receiving second image data representing the two-dimensional locations of the multiple points of the mining wall, receiving depth data may comprise receiving depth data indicative of a change in depth of the mining wall, and determining data indicative of a change may comprise determining data indicative of a change of the two-dimensional locations of the multiple points of the mining wall.

The method may further comprise:
extracting a resource from a mine that comprises the mining wall; and
initiating a mitigation process in relation to the mine wall based on the data indicative of a change of the two-dimensional locations of the multiple points of the mining wall.

The method may further comprise:
locating the image sensor and the depth sensor on respective benches of a mine pit opposite to the mining wall; and
directing the image sensor and the depth sensor at the mining wall such that the image sensor captures the first image data and the second image data and the depth sensor captures the depth data.

The mining wall may be a bench wall defined as the wall between two benches of the mine pit.

The method may further comprise adjusting an optical property of the image sensor such that the multiple points of the mining wall are multiple points of a desired area to be monitored.

The method may further comprise:
receiving from the image sensor further image data representing the two-dimensional locations of the multiple points of the wall associated with multiple further points in time; and
receiving further depth data from the depth sensor indicative of a change in depth of the wall between the multiple further points in time;
wherein determining the data indicative of the change of the two-dimensional locations of the multiple points of the wall is based on the further image data and the further depth data.

The method may further comprise updating a graphical display each time further image data is received or each time further depth data is received.

The method may further comprise:
generating requests for the further image data based on a time difference between the further points in time; and
determining an updated time difference based on the data indicative of a change of the two-dimensional locations of the multiple points of the wall.

Software, when installed on a computer, causes the computer to perform the method of any one of the preceding claims.

A computer system for monitoring a wall comprises:
an input port
to receive from an image sensor first image data representing two-dimensional locations of multiple points of the wall associated with a first point in time and second image data representing the two-dimensional locations of the multiple points of the wall associated with a second point in time, the second point in time being later than the first point in time, and
to receive depth data from a depth sensor indicative of a change in depth of the wall between the first point in time and the second point in time; and
a processor to determine data indicative of a change of the two-dimensional locations of the multiple points of the wall between the first point in time and the second point in time based on the first image data, the second image data, and the depth data.

A system for monitoring a wall comprises:
an image sensor to capture
first image data representing two-dimensional locations of multiple points of the wall associated with a first point in time, and
second image data representing two-dimensional locations of multiple points of the wall associated with a second point in time, the second point in time being later than the first point in time;
a depth sensor to capture
depth data indicative of a change in depth of the wall between the first point in time and the second point in time; and
a processor to determine data indicative of a change of the two-dimensional locations of the multiple points of the wall between the first point in time and the second point in time based on the first image data, the second image data, and the depth data.

The image sensor may be an optical camera and the depth sensor may be a radar or laser range finder.

A spatial resolution of the image sensor may be such that each of the multiple points of the wall covers less than 0.1 square metres on the wall and a spatial resolution of the depth sensor may be such that the depth data is indicative of the change in depth of more than 0.1 square metres on the wall. The spatial resolution of the image sensor may be higher than 1 megapixels.

The spatial resolution of the image sensor in relation to a spatial resolution of the depth sensor may be such that one value for change in depth relates to more than 100 two-dimensional locations.

The wall may be a mining wall.

The image sensor and the depth sensor may be located on respective mine benches of a mining pit opposite to the mining wall.

An open pit mine comprises:
multiple benches defining respective multiple bench walls between the multiple benches;

multiple mining machines to extract material from the open pit mine;

a system as define above for monitoring one or more of the multiple bench walls; and a signalling system to initiate a mitigation process in relation to the one or more of the multiple bench walls and one or more of the multiple mining machines.

Optional features described of any aspect of method, system, computer system and software for monitoring a wall, where appropriate, similarly apply to the other aspects also described here.

For the purposes of the present invention, a wall includes any interface or surface between two media, where the first medium is often air and the second medium is often a solid, such as rock, brick concrete and other solids. The purpose of the wall is often to retain the solid against forces from within the solid and movement of the solid can be observed by observing the wall. This includes a slope, deformation or other structure having a surface of which one end or side is at a higher level than another (i.e. a rising or falling surface). The wall may form a barrier or enclose a space. The monitoring of the wall may relate to monitoring changing dimensions of the wall as it responds to forces acting upon it. The wall may comprise deformable or non-deformable material of variations sizes and compositions.

BRIEF DESCRIPTION OF DRAWINGS

FIG. 1 illustrates a simplified open-pit mine (prior art). An example will be described with reference to FIG. 2 illustrates an improved mine, where a monitoring system for monitoring a mining wall is installed.

DESCRIPTION OF EMBODIMENTS

Figure 2:
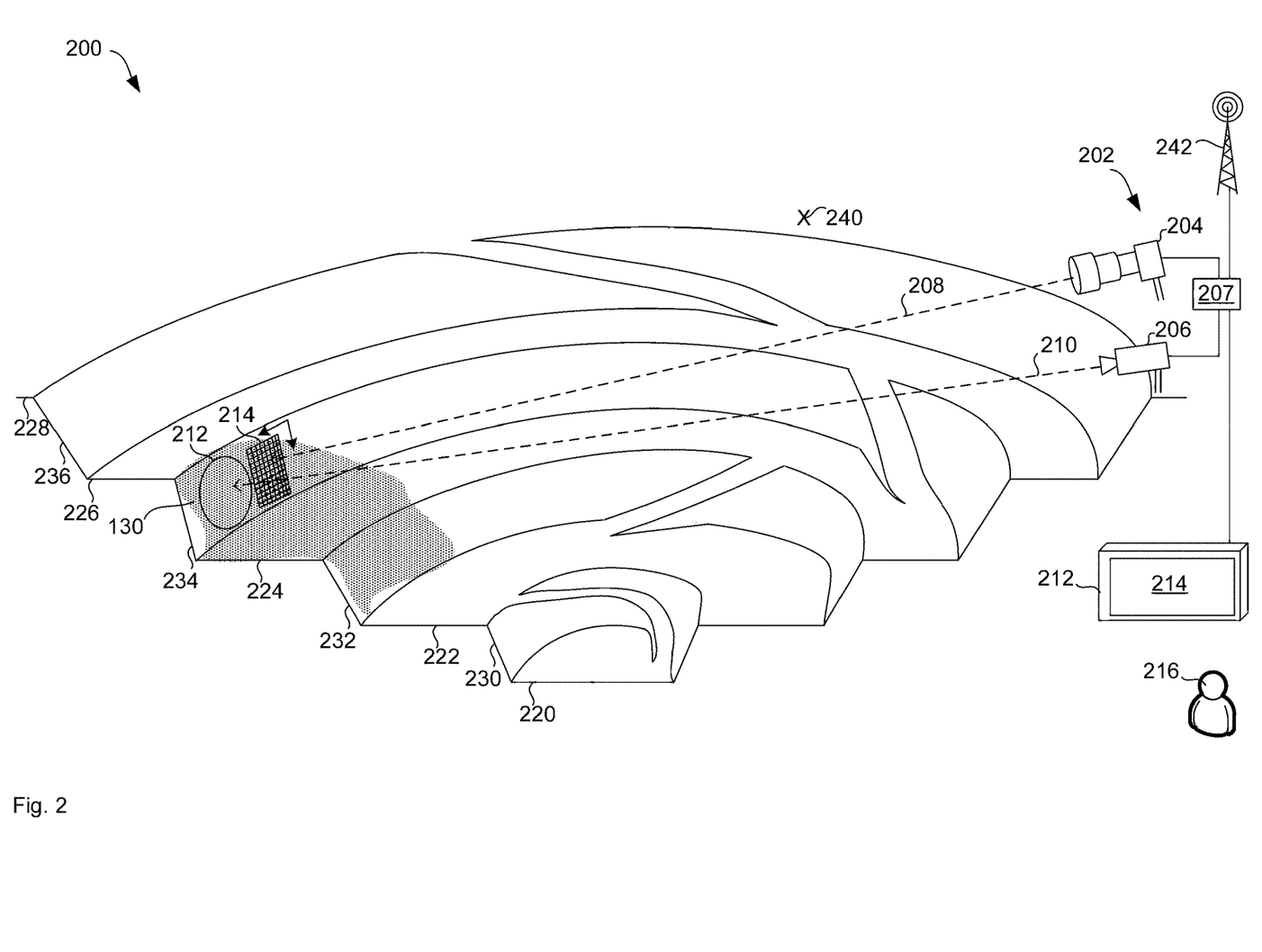

FIG. 2 illustrates an improved mine 200, where a monitoring system 202 for monitoring mining wall 130 is installed on an opposite edge to the wall 130 to be monitored.

It is to be understood that mining wall 130 may be any inclined or vertical surface that is related to the extraction of a resource. The inclined surface may be rugged, broken and may comprise faults, defects and other discontinuities and rock mass structures. Mining walls may be man-made, such as walls separating benches created by excavation of a mining pit. Mining walls may also be nature-made, such as hill slopes or naturally occurring rock walls. The proposed methods and systems may apply to mining and non-mining operations, such as extraction of coal, copper or gold or monitoring of deformations of natural or man-made slopes, excavations, constructions and mobile plants.

The monitoring system 202 comprises an image sensor 204 and a depth sensor 206 both of which are connected to a computer system 207. Generally, the image sensor 204 can be any sensor that acquires a multi-pixel two-dimensional representation that is perpendicular to a line of sight 208 from the image sensor 204 to the mining wall 130. In one example, this may be a photographic camera, such as a consumer single lens reflex (SLR) camera, a hyperspectral camera, any other passive multi-pixel sensor or an active image sensor, such as an infrared camera with an infrared light source that does not require daylight to operate.

The depth sensor 206 may be a radar system, such as the IDS IBIS radar system or the GroundProbe SSR radar system, or a laser range finding system, such as the Site Monitor laser system by 3D laser mapping. It is noted, however, that current radar systems are more accurate than current laser range finding systems and therefore, radar systems are the preferred choice. The depth sensor 206 may capture a distance of one location of the wall 130 from the depth sensor 206 along a line of sight 210 from the depth sensor 206 to the wall 130. In another example, depth sensor 206 captures the distance of multiple different locations of the wall 130 from the depth sensor 206.

In one example, image sensor 204 and depth sensor 206 are located in close proximity to each other. As a result, when the following description makes reference to the line of sight, the line of sight 208 of the image sensor 204 and the line of sight 210 from the depth sensor 206 are considered to be identical.

Considering the depth sensor 206 is a radar system, depth sensor 206 generates a beam of electromagnetic waves and focusses the beam onto the mining wall. The beam width depends on the length of radar antenna or diameter of a dish-type antenna. For practical antenna lengths and dish sizes the beam width is relatively large compared to the field of view of each pixel of the image sensor 204.

In the example of FIG. 2, the radar beam is incident on a first area 212 and the image sensor 204 captures an image of a second area 214 with the individual pixels indicated as squares within second area 214. While the first area 212 and the second area 214 are shown disjoint for clarity of illustration, in most examples, the first area 212 would overlap the second area 214. Depth sensor 206 captures a single depth value at one time for the first area 212 while image sensor 204 captures multiple pixel values at one time for second area 214. In one example, depth sensor 206 is rotatably mounted to allow the depth sensor 206 to scan the wall 130, such that over time multiple depth values are captured covering the entire mining wall 130.

Depth sensor 206 may continuously scan the mining wall 130 over time such that the first area 212 is scanned multiple times at subsequent points in time. This allows the depth sensor 206 to determine depth data that is indicative of a change in the depth of area 212 of the wall 130, such as a change in millimetres per day.

As shown in FIG. 2, the open pit mine 200 comprises five benches 220, 222, 224, 226 and 228, respectively. Between the benches are four bench walls or faces 230, 232, 234 and 236, respectively. In the example of FIG. 2, mine wall 130 that is to be monitored covers bench wall 232 and bench wall 234. That is, monitoring system 202 monitors the wall between benches 222 and 224 and the wall between benches 224 and 226. Image sensor 204 and depth sensor are located on top bench 228 and opposite to the mining wall 130. . Further, opposite mining wall 130 may also refer to a location on a line from mining wall 130 which is not exactly perpendicular to mining wall 130. For example, location 240 may also be considered opposite the mining wall 130 as the direct line of sight from location 240 to mining wall 130 passes a substantial part of the mine pit and offers substantially unobstructed view of the mining wall 130.

In one example, open pit mine further comprises a signalling system 242 to initiate a mitigation process in relation to the bench wall 234. The signalling system may be a data transmission system that sends alerts to the mining machines to instruct the machines or the operators of those machines to leave the mine pit or to move away from wall 234. Signalling system 242 may also be an acoustic system that generates an acoustic alarm, such as a siren, to alert staff of the unstable bench wall 234.

Figure 3:
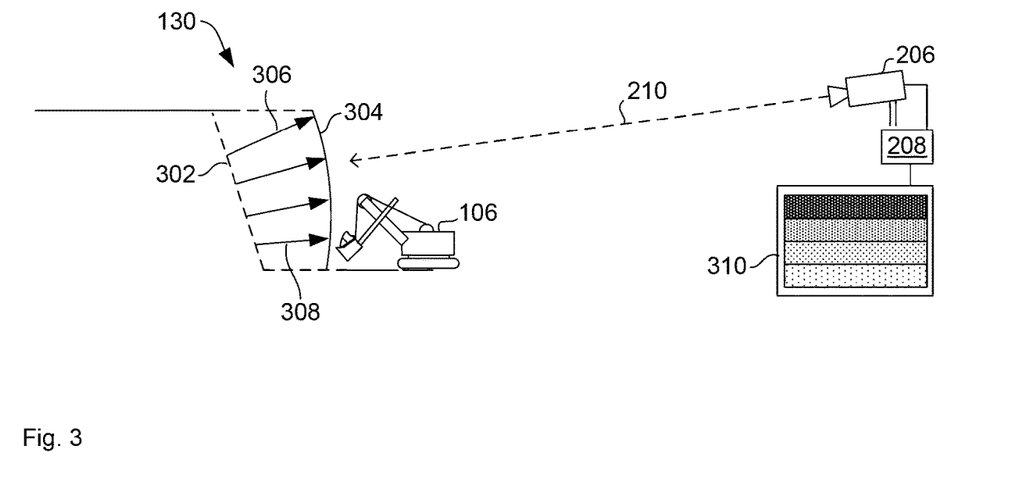
FIG. 3 illustrates a side elevation of the mining wall and the depth sensor of FIG. 2.

FIG. 3 illustrates a side elevation of mining wall 130 and depth sensor 206. In this example, mining wall 130 moves from a first position 302 to a second position 304 and deforms during this move. Depth sensor 206 captures the distance at each of four vertically aligned areas on mining wall 130 at two consecutive points in time. Depth sensor 206 then determines depth data indicative of a change in the depth of the wall 130, which is indicated as four arrows in FIG. 3. For example, the topmost arrow 306 indicates a relatively large change, while the bottom arrow 308 indicates a relatively small change. Note that these arrows represent deformation along the line of sight of the depth sensor 206 and may converge. As an example, the deformation of the wall 130 may be assessed as leading to likely collapse in the near future and shovel 106 should be moved to safety immediately to avoid risking machinery and personnel. The depth data may be presented as a graphical representation 310 of the mining wall where dark areas indicate areas of relatively great movement while light areas indicate areas of relatively small movement.

In one example, depth sensor 206 pre-processes the measurements such that the depth data is indicative of an acceleration of the mining wall 130 towards the depth sensor 206.

It is noted that depth sensor 206 only detects movement of the mining wall 130 in the direction of line of sight 210 (LOS) and not in the direction perpendicular to the line of sight (PLOS).

Figure 4A:
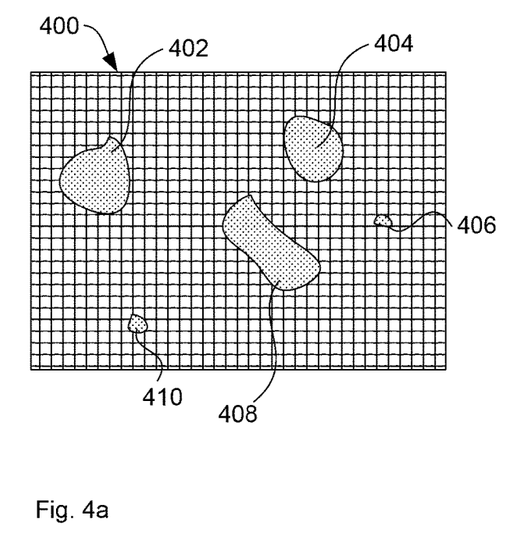
FIGS. 4a and 4b illustrate first image data and second image data as captured by the image sensor of FIG. 2.
Figure 4B:
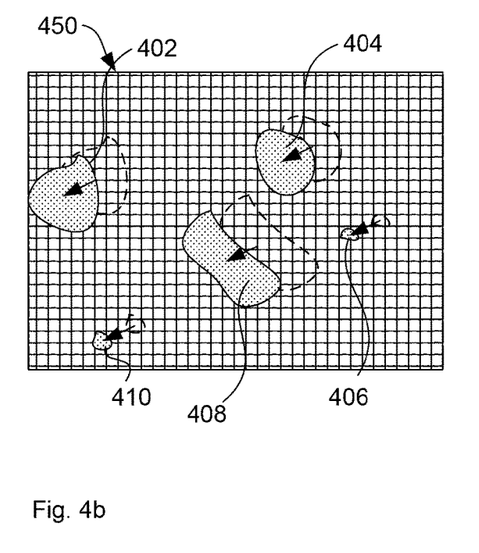

FIGS. 4a and 4b illustrate first image data 400 and second image data 450, respectively, as captured by image sensor 204. First image data 400 represents two-dimensional locations of multiple points of the mining wall. For example, a first object 402 can be considered as covering multiple points of the mining wall and the first image data 400 represents the two-dimensional location of the points of first object 402. More particularly, the first image data 400 represents the two-dimensional location as a pixel coordinates of these points relative to the sensor. For example, the image sensor has a resolution of 7,360×4,912 pixels and as a result, the horizontal coordinate of the points on the mining wall ranges from 1 to 7,360 and the vertical coordinate ranges from 1 to 4,912.

Similarly, image data 400 represents two-dimensional locations of further points or objects 404, 406, 408 and 410. These objects may be rock formations, such as visible fault lines, ledges, boulders, rocks, stones, cobbles and pebbles as well as equipment, such as optical markers or light reflectors. Image sensor 204 may also be a hyperspectral camera and the objects may be defined by a continuous reflectance spectrum. Image sensor 204 may also comprise an infra-red image sensor that captures infra-red radiation emitted by an infrared light source and reflected off the wall 130. The infra-red light source may illuminate the wall 130 from sideways to generate more prominent shadows that may facilitate the detection of the objects or the shadows may constitute the multiple points of the mining wall 130.

First image data 400 is associated with a first point in time, such as the capture time of the image data 400. For example, first image data 400 was captured at 1 pm on 8 Jul. 2015. The capture date and time may be stored as meta-data of the image data according to JPEG format or RAW formats.

Second image data 450 in FIG. 4b also represents two-dimensional locations of objects 402, 404, 406, 408 and 410 as described with reference to the first image data 400 in FIG. 4a. However, the second image data 450 is associated with a second point in time being later than the first point in time associated with the first image data 400. For example, the second point in time is one day after the first point in time, that is, 1 pm on 9 Jul. 2015.

As can be seen in FIG. 4b, the objects 402, 404, 406, 408 and 410 have moved to different two-dimensional locations during that day as indicated by straight arrows in FIG. 4b. By matching the objects in FIG. 4a to the objects in FIG. 4b, computer system 207 can determine the two-dimensional movement of the mining wall perpendicularly to the line of sight 210. However, in most practical applications, the noise on this determination leads to unacceptable inaccuracies. In order to improve the accuracy, computer system 207 determines data indicative of a change of the two-dimensional locations of the multiple points of the mining wall between the first point in time and the second point in time based on the first image data 400, the second image data 450, and the depth data 310 of FIG. 3.

This fusion of depth data 310 and image data 400/450 is particularly useful where the depth data is highly accurate in terms of the detected movement and where the line of sight deformation of the mining wall 130 is correlated with the perpendicular to line of sight deformation of the mining wall 130. For example, processor 502 may use a linear relationship between the line of sight deformation and the perpendicular line of sight deformation. The mathematical details of the determination of the change of locations are provided further below.

Figure 5:
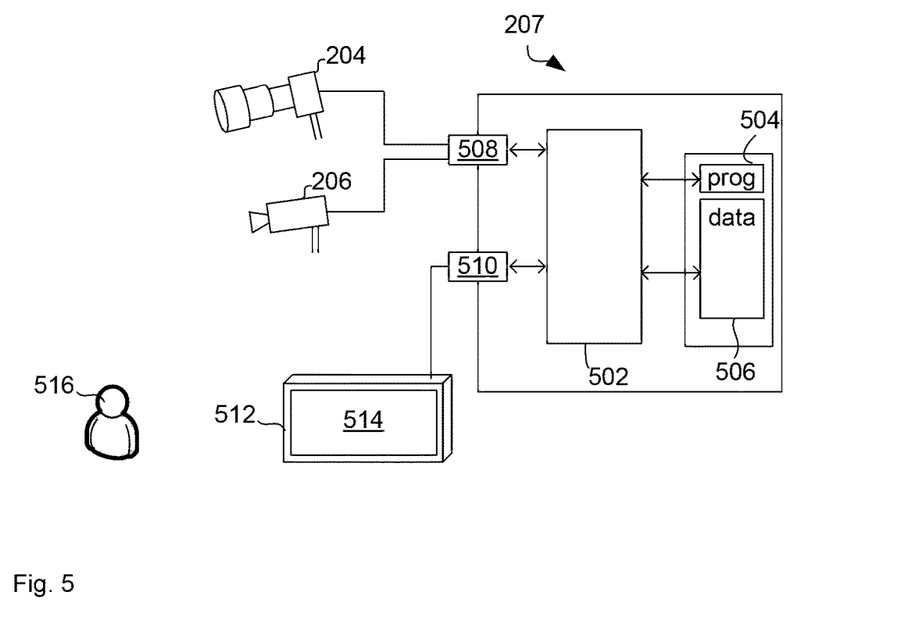
FIG. 5 illustrates the computer system for monitoring mining wall of FIG. 2 in more detail.

FIG. 5 illustrates computer system 207 for monitoring mining wall 130 in more detail. The computer system 207 comprises a processor 502 connected to a program memory 504, a data memory 506, a communication port 508 and a user port 510. The program memory 504 is a non-transitory computer readable medium, such as a hard drive, a solid state disk or CD-ROM. Software, that is, an executable program stored on program memory 504 causes the processor 502 to perform the method in FIG. 6, that is, processor 502 receives first and second image data and depth data and determines data indicative of a change of the mining wall.

The processor 502 may then store the data indicative of the change on data store 506, such as on RAM or a processor register. Processor 502 may also send the determined data via communication port 508 to a server, such as mine control centre.

The processor 502 may receive data, such as image data and depth data, from data memory 506 as well as from the communications port 508 and the user port 510, which is connected to a display 512 that shows a visual representation 514 of the mining wall 130 to an operator 516. In one example, the processor 502 receives image data and depth data from image sensor 204 or depth sensor 206 via communications port 508, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 502 receives and processes the image data and depth data in real time. This means that the processor 502 determines the data indicative of a change of the two-dimensional locations of the mining wall every time image data or depth data is received from sensors 204 and 206 and completes this calculation before the sensors 204 or 206 send the next update.

Although communications port 508 and user port 510 are shown as distinct entities, it is to be understood that any kind of data port may be used to receive data, such as a network connection, a memory interface, a pin of the chip package of processor 502, or logical ports, such as IP sockets or parameters of functions stored on program memory 504 and executed by processor 502. These parameters may be stored on data memory 506 and may be handled by-value or by-reference, that is, as a pointer, in the source code.

The processor 502 may receive data through all these interfaces, which includes memory access of volatile memory, such as cache or RAM, or non-volatile memory, such as an optical disk drive, hard disk drive, storage server or cloud storage. The computer system 500 may further be implemented within a cloud computing environment, such as a managed group of interconnected servers hosting a dynamic number of virtual machines.

It is to be understood that any receiving step may be preceded by the processor 502 determining or computing the data that is later received. For example, the processor 502 determines image data or depth data and stores the image data or depth data in data memory 506, such as RAM or a processor register. The processor 502 then requests the data from the data memory 506, such as by providing a read signal together with a memory address. The data memory 506 provides the data as a voltage signal on a physical bit line and the processor 502 receives the image data or depth data via a memory interface.

It is to be understood that throughout this disclosure unless stated otherwise, nodes, edges, graphs, solutions, variables and the like refer to data structures, which are physically stored on data memory 506 or processed by processor 502. Further, for the sake of brevity when reference is made to particular variable names, such as "point in time" or "quantity of movement" this is to be understood to refer to values of variables stored as physical data in computer system 207.

Figure 6:
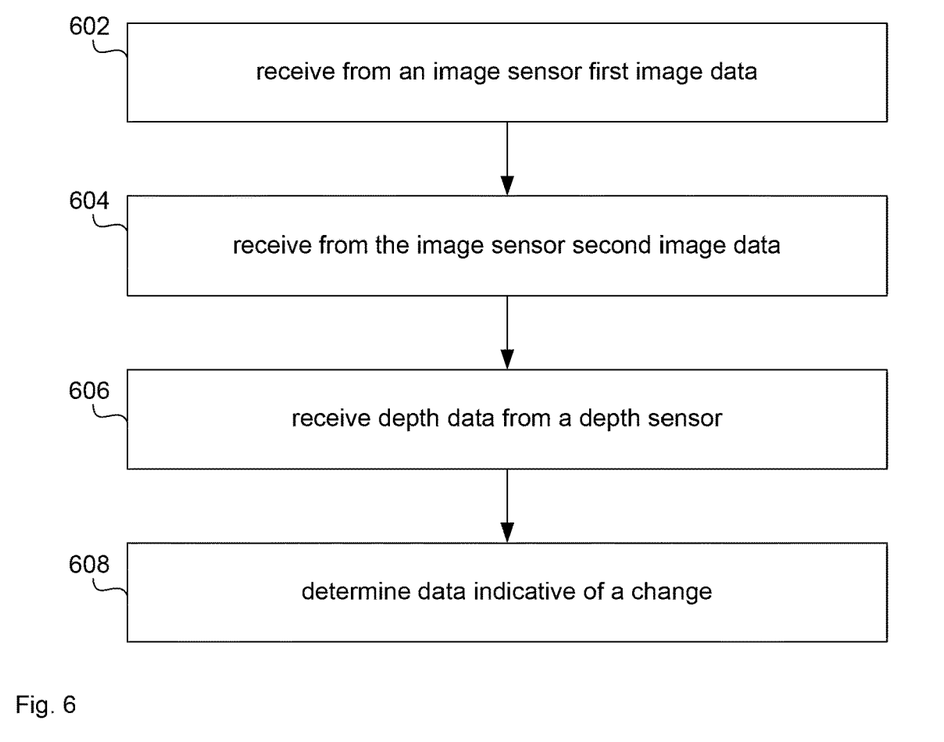
FIG. 6 illustrates a method as performed by processor of FIG. 5 for monitoring a mining wall.

FIG. 6 illustrates a method 600 as performed by processor 502 for monitoring a mining wall. Processor 502 first receives 602 from image sensor 204 first image data 400 representing two-dimensional locations of multiple points of the mining wall 130 associated with a first point in time as described with reference to FIG. 4a.

Processor 502 further receives 604 from image sensor 204 second image data 450 representing the two-dimensional locations of the multiple points of the mining wall 130 associated with a second point in time, the second point in time being later than the first point in time as described with reference to FIG. 4b.

Processor 502 also receives 606 depth data 310 from depth sensor 206 indicative of a change in depth of the mining wall between the first point in time and the second point in time as described with reference to FIG. 3. It is noted that the depth data may be recorded for a time period that is different to the time period between the first point in time and the second point in time. For example, the depth data may be indicative of a change in depth of the mining wall 130 between a point in time that is before the first image data 400 was captured and a point in time that is after the second image data 450 was captured. Such 'wider' depth data is still indicative of the change of depth for the time during the capture of the two images. Computer system 207 may interpolate the depth data or the image data to align the different time scales.

Finally, processor 502 determines 608 data indicative of a change of the two-dimensional locations of the multiple points of the mining wall between the first point in time and the second point in time based on the first image data, the second image data, and the depth data.

FIG. 6 is to be understood as a blueprint for the monitoring software program and may be implemented step-by-step, such that each step in FIG. 6 is represented by a function or class in a programming language, such as C++ or Java. The resulting source code is then compiled and stored as computer executable instructions on program memory 504.

Mining wall 130 may also be referred to as a slope. The slope is deforming due to the development of a failure, and the deformation can be characterised by a 3D vector. Due to operational and other reasons, slope monitoring radar 206 may be placed in a sub-optimal location with respect to the deformation such that only a component of the 3D deformation vector (say at an angle θ of 30 degrees) is along the line of sight (LOS) of the radar 206.

The other component (sin(30) or 50%) corresponds to perpendicular to line of sight (PLOS) deformation, potentially detectable by the proposed imaging system 204.

Figure 7:
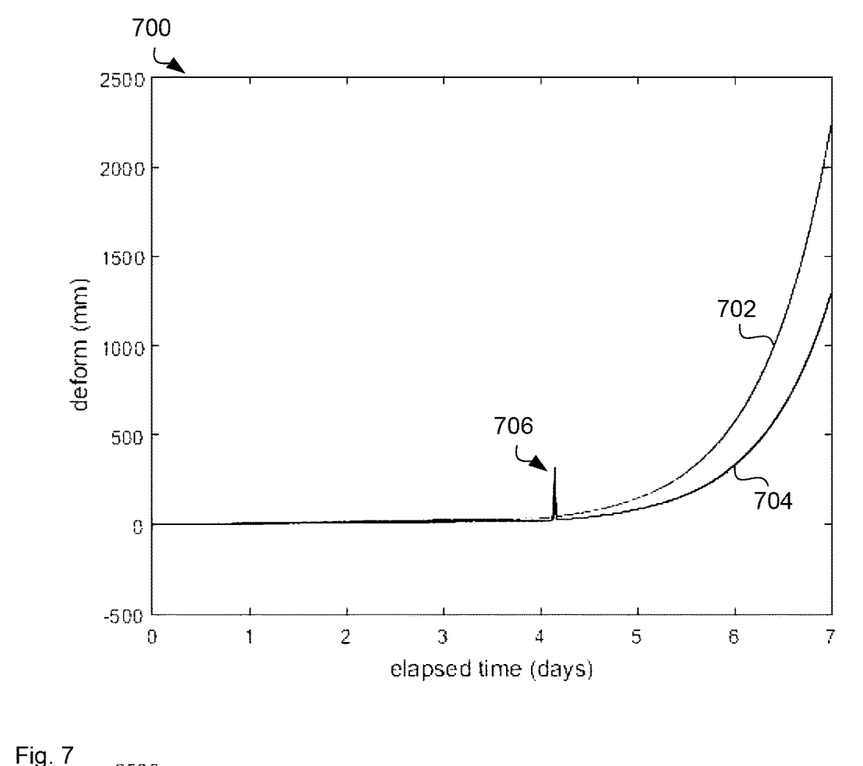
FIG. 7 illustrates an example deformation of the mining wall of FIG. 2.

FIG. 7 illustrates an example deformation 700 of the wall 130 comprising a deformation along the LOS 702 and PLOS 704. The rate of deformation is non-linear and may indeed progress through both 'progressive' and 'regressive' phases as described in Fukuzono, T. (1985) A new method for predicting the failure time of a slope, in Proceedings 4th International, Conference and Field Workshop on Landslides, Tokyo, Tokyo University Press, pp. 145150, which is incorporated herein by reference.

In one example, mining wall 130 shows constant velocity deformation and from day 4, gradually accelerating over 3 more days. The movement may comprise a Gaussian 'spike' 706 at 4.15 days to represent some anomalous, unpredictable behaviour (e.g. stick-slip of the failure).

Finally, sub-millimetre noise may be present in the LOS data, which can be found in some radar deformation monitoring systems.

In one example, the calculations performed by processor 502 are based on an assumption that the true perpendicular to LOS (PLOS) deformations are a linear function of the LOS deformations, such as the case for a rigid block sliding with no rotation. In other words, the calculations are based on a positive correlation between the acceleration of the mining wall towards the depth sensor 206 and the acceleration of the two-dimensional locations of the multiple points of the mining wall 130. As previously stated, the relationship of the PLOS and LOS components is given by $$PLOS = \tan(\theta) * LOS$$

Figure 8:
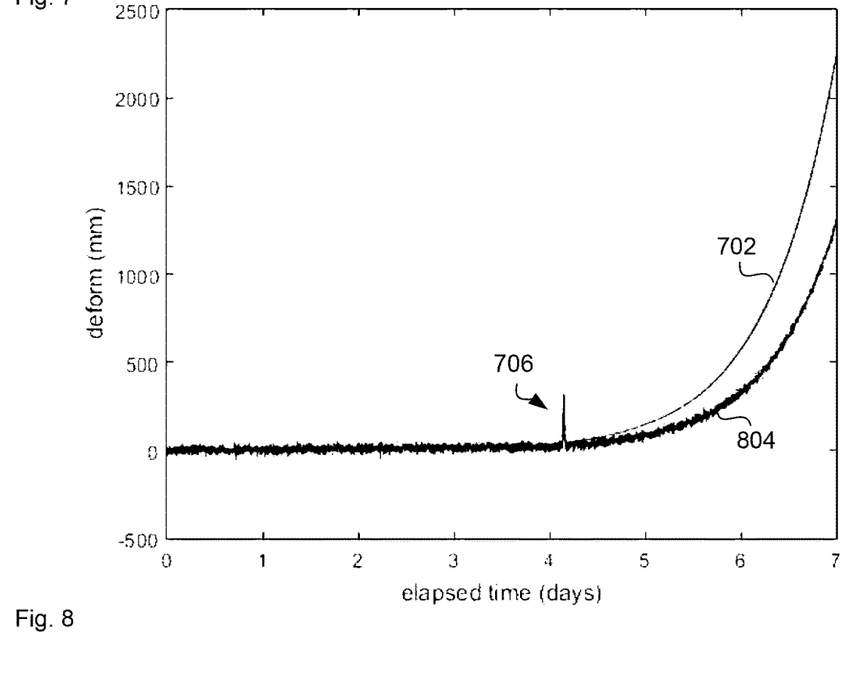
FIG. 8 illustrates the deformation measurements of FIG. 7 comprising additional noise.

FIG. 8 illustrates the deformation measurements comprising additional noise 804 affecting the measurements of the PLOS 400 and 450. The noise may be much greater than the noise on the radar data 310. For an imaging system employing feature tracking to measure PLOS, processor 502 may use sub-pixel accuracy for the feature matching. In one example, imaging sensor 204 is a camera, such as a Nikon D800e and AF-S NIKKOR 800 mm f/5.6E FL ED VR 35.9 mm×24 mm Nikon FX format 7,360×4,912 pixels. The range to target may be 1000 metres. Multiples of this pixel size (three times) is added as zero mean Gaussian noise to the PLOS data.

Figure 9:
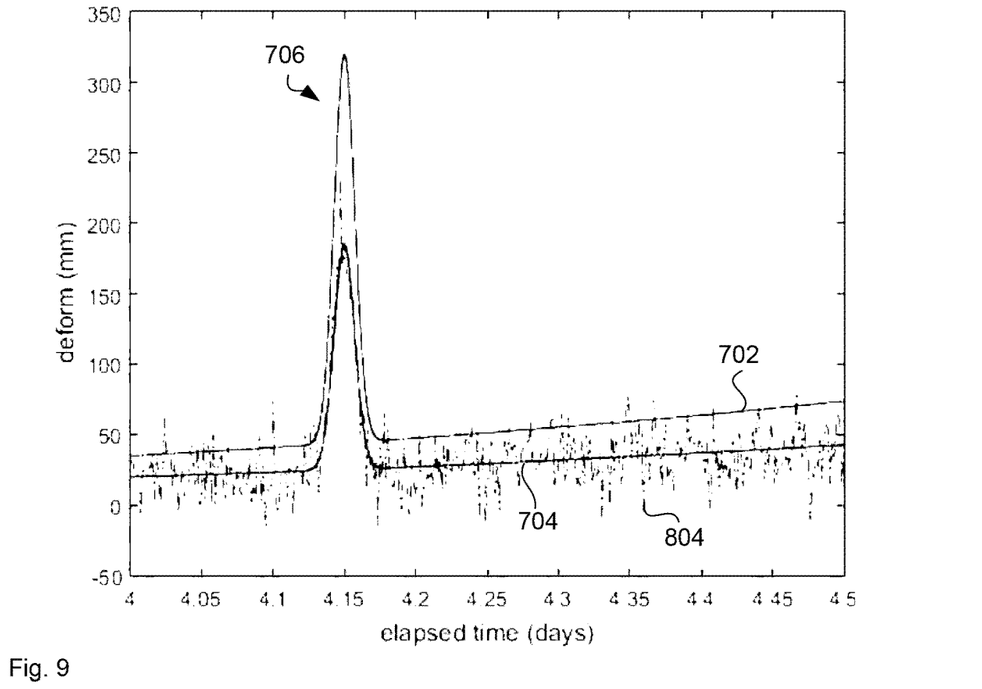
FIG. 9 illustrates an enlarged period of the measurements of FIG. 8.

The significance of the noise may become apparent when measurements are undertaken as the accelerating phase begins. FIG. 9 illustrates an enlarged period of the LOS measurements 702, PLOS measurements 704 and noise 804 from 4 to 4.5 days, which also includes the 'spike' event 706.

In one example, an adaptive filtering method, such as a Kalman filter, may be used as a component of the data processing algorithm in method 608.

A Kalman filter is a recursive data processing algorithm. It allows processing of all available measurements for estimation of the current variables being studied. The constraints for using a Kalman filter are sufficient for this demonstration, namely that the process model be linear (unless the extended version of the filter is used), the process noise be Gaussian and white (constants spectral density). It is defined as $$x_t = A_t x_{t-1} + B_t u_t + w_t$$

where $A_t$ represents the state transition model which is applied to the previous state $B_t$ represents the control-input model and $w_t$ is the process noise defined as $$w_t \sim N(0, Q_t)$$

where Q represents the covariance of the process noise.

The system being modelled assumes a measurement model applies that describes how the sensor data relates to the state variables:

$$z_t = H x_t + v_t$$

where $z_t$ is the predicted measurement model after accounting for the estimated state and measurement noise $v_t \sim N(0, R_t)$ where R represents the covariance of the measurement noise.

Processor 502 applies a Kalman filter using the LOS signal, that is, the depth data, as a guide to the PLOS signal, that is, the image data. Let us define the system state as the PLOS true, that is, the data indicative of a change of the two-dimensional locations of the multiple points of the mining wall, and the LOS data, that is, the depth data, as a control signal. State $$x_t = \text{PLOStrue}$$

Measure $$z_t = \text{PLOSmeas (image data)}$$

Control Input:

$$u_t = \text{LOSmeas (depth data)}$$

In one example, the calibration constant B for the control signal is assumed to be known perfectly.

In another example, processor 502 performs the calculations with an inaccurate estimate (i.e. guess) of calibration constant B for the control signal. In some examples, processor 502 determines this constant such as through the use of iterative estimation algorithms, such as Expectation Maximisation, in a pre-processing step.
State $$x_t = \text{PLOStrue}$$

Measure $$z_t = \text{PLOSmeas}$$

Control input:

$$u_t = \text{LOSmeas}$$

so $$x_t = B_t u_t + w_t$$

If the constant is not calibrated, there may be a systematic bias error in the filtered LOS data.

Kalman filter using LOS in process model

Processor 502 may also use a different filter where the state is defined using a velocity inferred from the LOS data:

$$\dot{\text{PLOS}} = d(\text{PLOStrue})/dt \sim d(\text{LOS})/dt$$

that is, $\dot{\text{PLOS}}$ (PLOSdot) is the derivative of the perpendicular to line of sight position with respect to time, which is the velocity perpendicular to the line of sight. This velocity is assumed to be proportional to the derivative of the line of sight movement with respect to time, which is the velocity along the line of sight.

In this method, no prior knowledge of the geometry (i.e. $\tan(\theta)$ factor) is assumed. State $$x_t = [\text{PLOStrue} \ \dot{\text{PLOS}}]$$

Measure $$z_t = \text{PLOSmeas}$$

(i.e. no velocity measurement) so $$H = [1 \ 0]$$

Control input:

$$u_t = 0$$

so $$x_t = A_t z_{t-1} + w_t$$

With the above definitions processor 502 can perform the predict and update steps of the Kalman filter as follows where t is replaced by k:

Predicted (a priori) state estimate: $\hat{x}_{k|k-1} = A_k \hat{x}_{k-1|k-1} + B_k u_k$
Predicted (a priori) estimate covariance $P_{k|k-1} = A_k P_{k-1|k-1} A_k^T + Q_k$
Measurement residual: $\tilde{y}_k = z_k - H_k \hat{x}_{k|k-1}$
Innovation (or residual) covariance $S_k = H_k P_{k|k-1} H_k^T + R_k$
Optimal Kalman gain $K_k = P_{k|k-1} H_k^T S_k^{-1}$
Updated (a posteriori) state estimate $\hat{x}_{k|k} = \hat{x}_{k|k-1} + K_k \tilde{y}_k$
Updated (a posteriori) estimate covariance $P_{k|k} = (I - K_k H_k) P_{k|k-1}$.

In one example, the values of the above matrices are determined based on library functions providing the Kalman filter, such as Python libraries pykalman, scipy, filterpy or Matlab kalman class in the Control System Toolbox.

To summarise, the variable x holds data indicative of a change of the two-dimensional location (PLOS) and depth (LOS) of the multiple points of the mining wall and the calculation of x is based on the image data and depth data represented by the variable z and also potentially the variable u.

Figure 10:
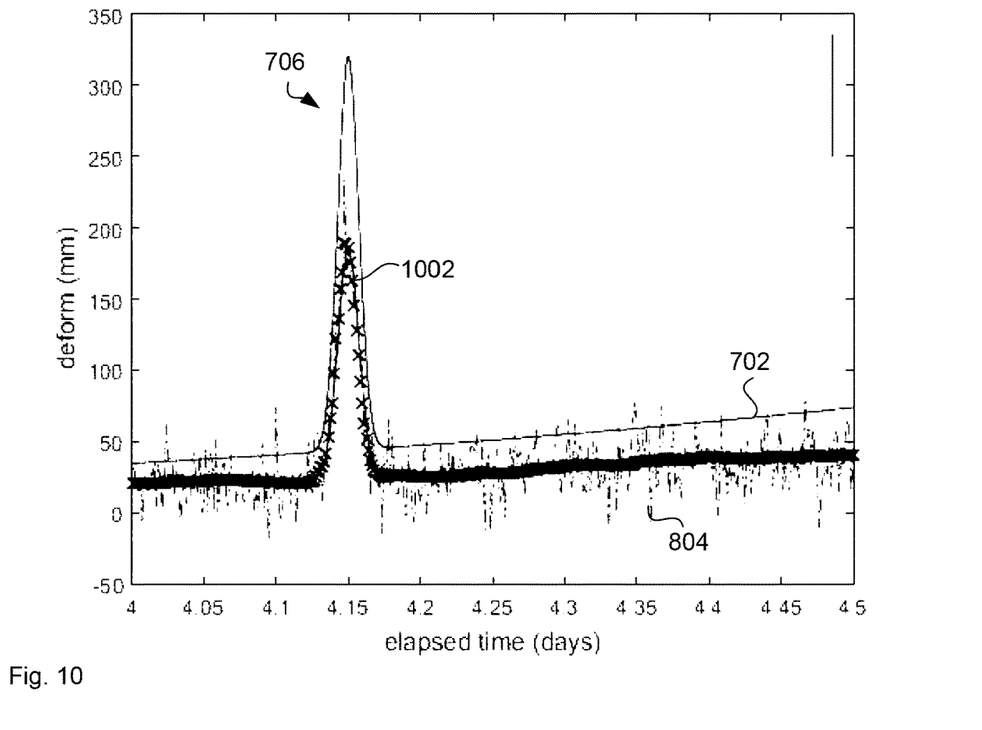
FIG. 10 illustrates data indicative of a change of the two-dimensional locations of the multiple points of the mining wall as calculated according to the method in FIG. 6.

FIG. 10 illustrates the result of method 500 where the crosses 1002 indicate the result of the Kalman filtered PLOS signal.

Figure 11:
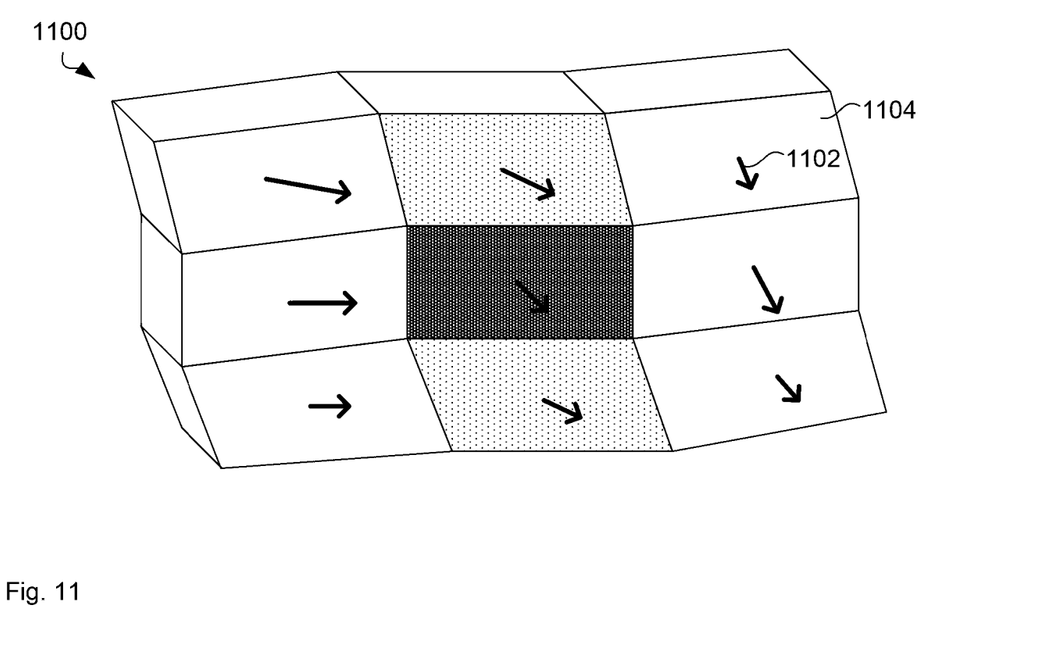
FIG. 11 illustrates a simplified block model of the mining wall.

FIG. 11 illustrates a simplified block model 1100 of mining wall 130, where the mining wall 130 is spatially discretised in three dimensions resulting an multiple blocks spanning the three-dimensional shape of the mining wall 130. By calculating the data indicative of the change of the two-dimensional locations (PLOS) processor 502 can use the depth data (LOS) to assign a three-dimensional vector of movement or acceleration to each block. These vectors are depicted as vectors in FIG. 11 such as example vector 1102 for example block 1104.

Processor 502 may generate a graphical representation of each the multiple blocks of the block model of the mining wall similar to what is shown in FIG. 11, which may be displayed on display device 512 in FIG. 5. In the graphical representation, the colour of the blocks may be indicative of the speed of movement of that block. In the example of FIG. 11 a dark colour indicates a relatively fast movement and therefore a relatively unstable part of the wall while white colour represents a relatively slow movement and therefore, a relatively stable part of the wall.

Once the two dimensional movement of that block (PLOS) or the LOS movement satisfies a predefined criterion, such as maximum deformation, speed or acceleration, processor 502 initiates a mitigation process, such as by generating an alarm that may trigger the evacuation of the mine 100, or evacuation from the area affected by a potential collapse of mining wall 130, or modification of mine operations to mitigate the risk associated with wall collapse for people and machinery. .

It will be appreciated by persons skilled in the art that numerous variations and/or modifications may be made to the specific embodiments without departing from the scope as defined in the claims. For example, while the above examples relate to monitoring pit walls in mining operations, the disclosed methods and systems may be equally applicable in other applications of monitoring walls including any inclined and vertical planes or surfaces, such as monitoring exposed rock slopes and may even be applicable when monitoring other structures such as dams, bridges or mobile plant.

In those examples, image sensor 204 and depth sensor 206 are located at a distance, such as 1000 metres, from the structure and are directed at the structure. The objects in FIGS. 4a and 4b may then include features of that structure, such as windows, stay cables, edges or gaps between bricks or concrete blocks. In one example, monitoring system 202 monitors a concrete dam while the concrete cures over an extended period of time.

Wall monitoring may also relate to monitoring of landslides etc. The mining wall 130 may relate to a subterranean/sub-surface wall. In other words, the methods and systems disclosed herein may be applicable to slope monitoring in general including sub-surface slope monitoring and in particular, to monitoring of mining walls.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for monitoring a wall, the method comprising:
receiving from an image sensor first image data representing two-dimensional locations of multiple points of the wall associated with a first point in time;
receiving from the image sensor second image data representing the two-dimensional locations of the multiple points of the wall associated with a second point in time, the second point in time being later than the first point in time;
receiving depth data from a depth sensor indicative of a change in depth of the wall between the first point in time and the second point in time; and
executing a fusion algorithm, comprising a linear or non-linear equation, to fuse the depth data, the first image data, and the second image data by correlating the depth data, the first image data, and the second image data to calculate a quantitative measure of a change of the two-dimensional locations of the multiple points of the wall between the first point in time and the second point in time, the change representing movement of the wall comprising a component that is perpendicular to a line of sight of the depth sensor.

2. The method of claim 1, wherein
receiving depth data comprises receiving depth data indicative of an acceleration of the wall towards the depth sensor, and
determining the data indicative of the change of the two-dimensional locations is based on the acceleration of the wall.

3. The method of claim 2, wherein determining the data indicative of the change of the two-dimensional locations is based on a positive correlation between the acceleration of the wall towards the depth sensor and an acceleration of the two-dimensional locations of the multiple points of the wall.

4. The method of claim 3, wherein determining the data indicative of the change of the two-dimensional locations comprises applying an adaptive filter to the first and second image data and the adaptive filter is parameterised based on the acceleration of the wall towards the depth sensor.

5. The method of claim 4, wherein applying an adaptive filter comprises applying a Kalman filter and the Kalman filter is parameterised based on the deformation of the wall towards the depth sensor.

6. The method of claim 1, further comprising determining three dimensional movement of multiple blocks of a block model of the wall based on the data indicative of a change of the two-dimensional locations of the multiple points of the wall and the depth data.

7. The method of claim 6, further comprising generating a graphical display indicative of the three dimensional movement of the multiple blocks of the block model of the wall, wherein generating the graphical display comprises generating graphical vectors indicating a three-dimensional velocity and three-dimensional direction of each block of the multiple blocks of the block model of the wall or comprises generating a graphical representation of each the multiple blocks of the block model of the wall with a colour indicative of the speed of movement of that block.

8. The method of claim 1, wherein
monitoring a wall comprises monitoring a mining wall,
receiving first image data comprises receiving first image data representing two-dimensional locations of multiple points of the mining wall,
receiving second image data comprises receiving second image data representing the two-dimensional locations of the multiple points of the mining wall;
receiving depth data comprises receiving depth data indicative of a change in depth of the mining wall, and
determining data indicative of a change comprises determining data indicative of a change of the two-dimensional locations of the multiple points of the mining wall.

9. The method of claim 1, further comprising:
extracting a resource from a mine that comprises the mining wall; and
initiating a mitigation process in relation to the mine wall based on the data indicative of a change of the two-dimensional locations of the multiple points of the mining wall.

10. The method of claim 8, further comprising:
locating the image sensor and the depth sensor on respective benches of a mine pit opposite to the mining wall; and
directing the image sensor and the depth sensor at the mining wall such that the image sensor captures the first image data and the second image data and the depth sensor captures the depth data.

11. The method of claim 8, further comprising adjusting an optical property of the image sensor such that the multiple points of the mining wall are multiple points of a desired area to be monitored.

12. The method claim 1, further comprising:
receiving from the image sensor further image data representing the two-dimensional locations of the multiple points of the wall associated with multiple further points in time; and
receiving further depth data from the depth sensor indicative of a change in depth of the wall between the multiple further points in time;
wherein determining the data indicative of the change of the two-dimensional locations of the multiple points of the wall is based on the further image data and the further depth data.

13. The method of claim 12, further comprising updating a graphical display each time further image data is received or each time further depth data is received.

14. The method of claim 12, further comprising
generating requests for the further image data based on a time difference between the further points in time; and
determining an updated time difference based on the data indicative of a change of the two-dimensional locations of the multiple points of the wall.

15. A non-transitory computer-readable medium with instructions stored thereon that, when executed by a computer, cause the computer to perform the method of claim 1.

16. A computer system for monitoring a wall, the computer system comprising:
an input port
to receive from an image sensor first image data representing two-dimensional locations of multiple points of the wall associated with a first point in time and second image data representing the two-dimensional locations of the multiple points of the wall associated with a second point in time, the second point in time being later than the first point in time, and
to receive depth data from a depth sensor indicative of a change in depth of the wall between the first point in time and the second point in time; and
a processor to execute a fusion algorithm, comprising a linear or non-linear equation, to fuse the depth data, the first image data, and the second image data by correlating the depth data, the first image data, and the second image data to calculate a quantitative measure of a change of the two-dimensional locations of the multiple points of the wall between the first point in time and the second point in time, the change representing movement of the wall comprising a component that is perpendicular to a line of sight of the depth sensor.

17. A system for monitoring a wall, the system comprising:
an image sensor to capture
first image data representing two-dimensional locations of multiple points of the wall associated with a first point in time, and
second image data representing two-dimensional locations of multiple points of the wall associated with a second point in time, the second point in time being later than the first point in time;
a depth sensor to capture
depth data indicative of a change in depth of the wall between the first point in time and the second point in time; and
a processor to execute a fusion algorithm, comprising a linear or non-linear equation, to fuse the depth data, the first image data, and the second image data by correlating the depth data, the first image data, and the second image data to calculate a quantitative measure of a change of the two-dimensional locations of the multiple points of the wall between the first point in time and the second point in time based on the first image data, the second image data, and the depth data, the change representing movement of the wall comprising a component that is perpendicular to a line of sight of the depth sensor.

18. The system of claim 17 wherein a spatial resolution of the image sensor is such that each of the multiple points of the wall covers less than 0.1 square metres on the wall and a spatial resolution of the depth sensor is such that the depth data is indicative of the change in depth of more than 0.1 square metres on the wall.

19. The system of claim 17, wherein a spatial resolution of the image sensor is higher than 1 megapixels.

20. The system of claim 17, wherein a spatial resolution of the image sensor in relation to a spatial resolution of the depth sensor is such that one value for change in depth relates to more than 100 two-dimensional locations.

* * * * *